(12) United States Patent
Kingsborough et al.

(10) Patent No.: US 7,607,574 B2
(45) Date of Patent: *Oct. 27, 2009

(54) HYBRID TRANSACTION CARD PACKAGE ASSEMBLY

(75) Inventors: Donald Kingsborough, Danville, CA (US); Talbott Roche, Belvedere, CA (US); Amie Petersen, Livermore, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 11/380,838

(22) Filed: Apr. 28, 2006

(65) Prior Publication Data

US 2007/0251994 A1 Nov. 1, 2007

(51) Int. Cl.
*G06K 5/00* (2006.01)
(52) U.S. Cl. .................. 235/380; 235/375; 235/482; 705/38; 705/45
(58) Field of Classification Search ................ 235/380, 235/375, 492, 482; 705/45, 38
See application file for complete search history.

(56) References Cited

U.S. PATENT DOCUMENTS

| | | | |
|---|---|---|---|
| 4,722,376 A | 2/1988 | Rhyner | |
| 4,887,763 A | 12/1989 | Sano | |
| 4,937,963 A | 7/1990 | Barnes | |
| 5,281,799 A | 1/1994 | McIntire et al. | |
| 5,390,794 A | 2/1995 | Vulpitta | |
| 5,399,021 A | 3/1995 | Litt | |
| 5,609,253 A | 3/1997 | Goade, Sr. | |
| D385,488 S | 10/1997 | Smith et al. | |
| 5,720,158 A | 2/1998 | Goade, Sr. | |
| 5,735,550 A | 4/1998 | Hinkle | |
| 5,740,915 A | 4/1998 | Williams | |
| D394,387 S | 5/1998 | Williams | |
| 5,760,381 A | 6/1998 | Stich et al. | |
| 5,777,305 A | 7/1998 | Smith et al. | |
| 5,791,474 A | 8/1998 | Hansen | |
| 5,839,763 A | 11/1998 | McCannel | |
| 5,842,629 A | 12/1998 | Sprague et al. | |
| D411,765 S | 7/1999 | Holihan | |
| 5,918,909 A | 7/1999 | Fiala et al. | |
| 5,921,584 A | 7/1999 | Goade, Sr. | |
| 5,949,058 A | 9/1999 | Kimura | |
| 5,958,174 A | 9/1999 | Ramsberg et al. | |
| 5,975,302 A | 11/1999 | Young | |
| 5,997,042 A | 12/1999 | Blank | |
| 6,053,321 A | 4/2000 | Kayser | |
| 6,076,296 A | 6/2000 | Schaeffer | |
| 6,089,611 A | 7/2000 | Blank | |

(Continued)

OTHER PUBLICATIONS

U.S. Appl. No. 11/380,881, filed on Apr. 28, 2006, entitled "Transaction Card Package Assembly Having Enhanced Security.".

(Continued)

*Primary Examiner*—Allyson N Trail
(74) *Attorney, Agent, or Firm*—Conley Rose, P.C.; Rodney B. Carroll

(57) ABSTRACT

A transaction card package assembly comprising a transaction card and a card holder, wherein the package assembly further comprises at least three unique identifiers thereon such that the transaction card may be activated at a point of sale by either a one-step or two-step activation process.

23 Claims, 6 Drawing Sheets

U.S. PATENT DOCUMENTS

| | | |
|---|---|---|
| 6,109,439 A | 8/2000 | Goade, Sr. |
| 6,161,870 A | 12/2000 | Blank |
| 6,173,901 B1 | 1/2001 | McCannel |
| 6,199,757 B1 | 3/2001 | Kubert |
| 6,224,108 B1 | 5/2001 | Klure |
| 6,270,012 B1 | 8/2001 | Dawson |
| 6,305,717 B1 | 10/2001 | Chess |
| 6,315,206 B1 | 11/2001 | Hansen et al. |
| 6,328,341 B2 | 12/2001 | Klure |
| 6,358,607 B1 | 3/2002 | Grotzner et al. |
| 6,418,648 B1 | 7/2002 | Hollingsworth et al. |
| 6,439,613 B2 | 8/2002 | Klure |
| 6,454,165 B1 | 9/2002 | Dawson |
| 6,457,649 B1 | 10/2002 | Hileman |
| 6,471,127 B2 | 10/2002 | Pentz et al. |
| 6,543,809 B1 | 4/2003 | Kistner et al. |
| 6,588,658 B1 | 7/2003 | Blank |
| 6,619,480 B2 | 9/2003 | Smith |
| 6,640,974 B2 | 11/2003 | Malone |
| 6,679,970 B2 | 1/2004 | Hwang |
| 6,698,116 B2 | 3/2004 | Waldron |
| 6,708,820 B2 | 3/2004 | Hansen et al. |
| 6,715,795 B2 | 4/2004 | Klure |
| 6,729,656 B2 | 5/2004 | Kubert et al. |
| D493,829 S | 8/2004 | Foster |
| 6,832,720 B2 | 12/2004 | Dawson |
| 6,918,537 B2 | 7/2005 | Graves et al. |
| D509,654 S | 9/2005 | Miller |
| 6,957,737 B1 | 10/2005 | Frederickson et al. |
| 2002/0088851 A1* | 7/2002 | Hodes ........................ 235/380 |
| 2002/0100797 A1 | 8/2002 | Hollingsworth et al. |
| 2002/0184152 A1* | 12/2002 | Martin ........................ 705/45 |
| 2002/0185543 A1 | 12/2002 | Pentz et al. |
| 2003/0004889 A1 | 1/2003 | Fiala et al. |
| 2003/0018586 A1 | 1/2003 | Krahn |
| 2003/0066777 A1 | 4/2003 | Malone |
| 2003/0150762 A1 | 8/2003 | Biller |
| 2003/0194988 A1* | 10/2003 | Knox ........................ 455/406 |
| 2004/0173686 A1* | 9/2004 | Al Amri ..................... 235/492 |
| 2004/0182940 A1 | 9/2004 | Biller |
| 2005/0061889 A1 | 3/2005 | McGee et al. |
| 2005/0224572 A1* | 10/2005 | Kelley et al. ................. 235/375 |
| 2007/0017973 A1* | 1/2007 | Blank et al. .................. 235/380 |
| 2007/0017975 A1* | 1/2007 | Lewis et al. .................. 235/380 |
| 2007/0045404 A1* | 3/2007 | Andersen et al. ............. 235/380 |
| 2007/0055622 A1* | 3/2007 | Martin ........................ 705/38 |

OTHER PUBLICATIONS

U.S. Appl. No. 11/380,888, filed on Apr. 28, 2006, entitled "Transaction Card Package Assembly Having Enhanced Security.".

Foreign communication from a related counterpart application, International Search Report and Written Opinion, PCT/US07/67808, Nov. 7, 2008, 9 pages.

* cited by examiner

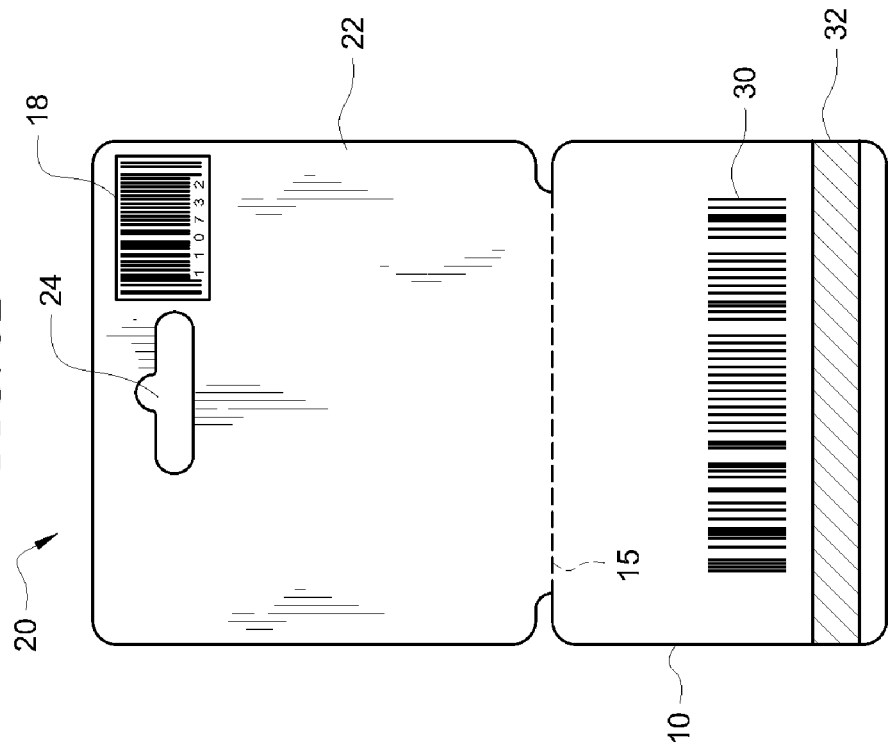
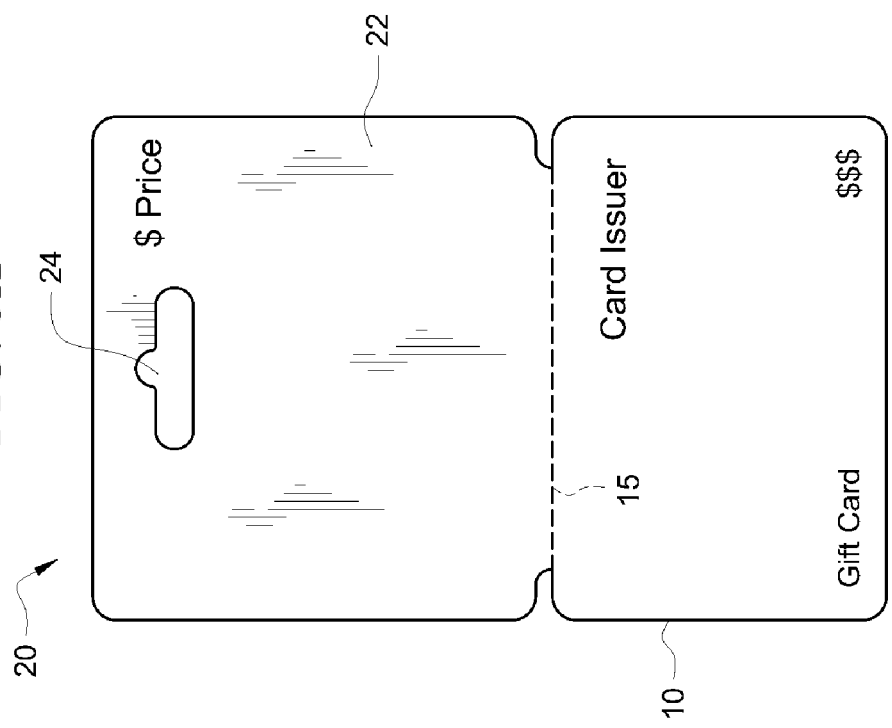

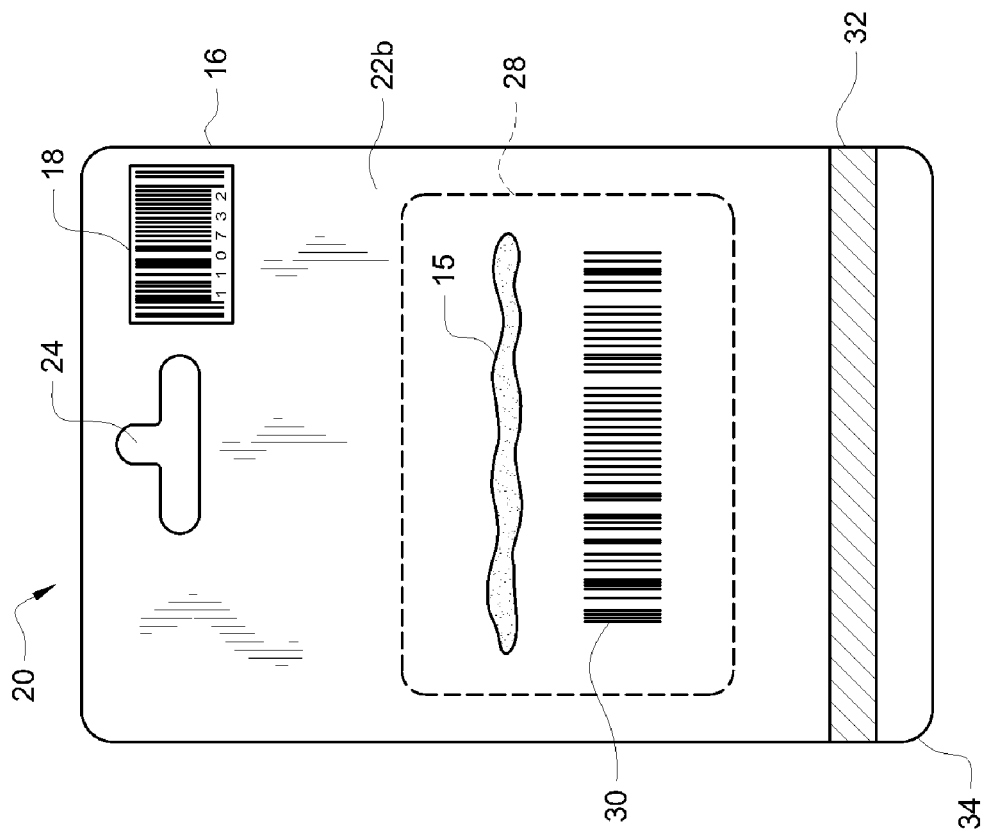
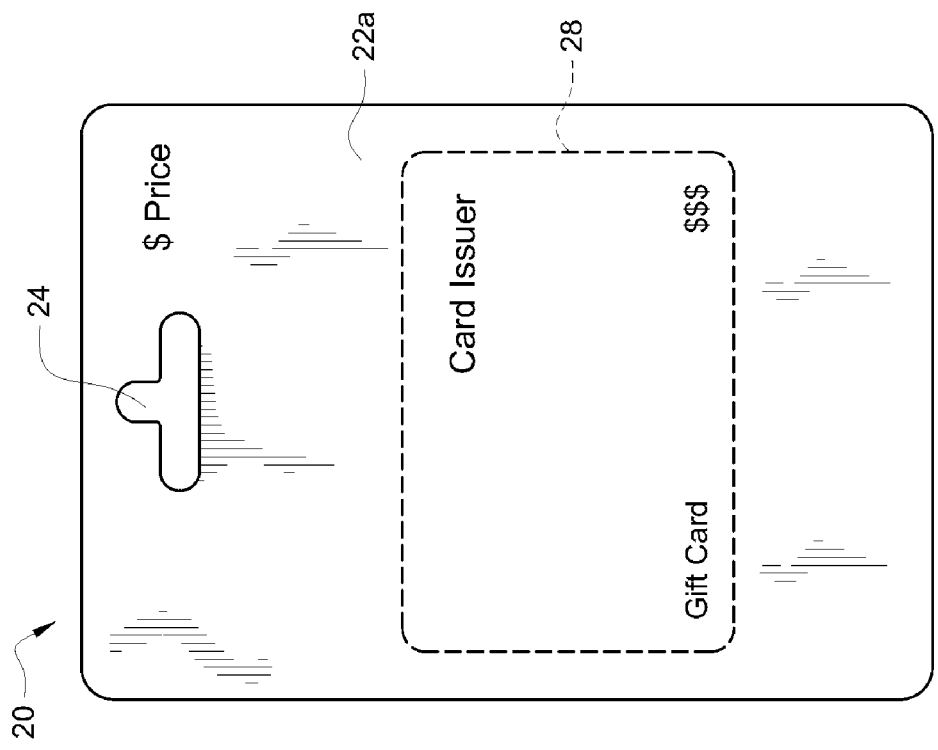

HYBRID TRANSACTION CARD PACKAGE ASSEMBLY

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVETON

The present invention generally relates to package assemblies for transaction cards such as gift cards, debit cards, credit cards, and the like.

BACKGROUND OF THE INVENTION

The market for transaction cards such as merchant gift cards continues to grow. Such cards may be displayed by a vendor in a retail store for purchase by a consumer. As a result, an ongoing need exists for improved transaction card package assemblies, which is addressed by the present disclosure.

SUMMARY OF THE INVETION

A transaction card package assembly comprising a transaction card and a card holder, wherein the package assembly further comprises at least three unique identifiers thereon such that the transaction card may be activated at a point of sale by either a one-step or two-step activation process.

BRIEF DESCRIPTION OF THE DRAWINGS

FIGS. 1A-6A are front views and FIGS. 1B-6B are back views of various embodiments of hybrid transaction card package assemblies according to the present disclosure.

DETAILED DESCRIPTION OF THE PREFERRED EMBODIMENTS

Figure 1B:
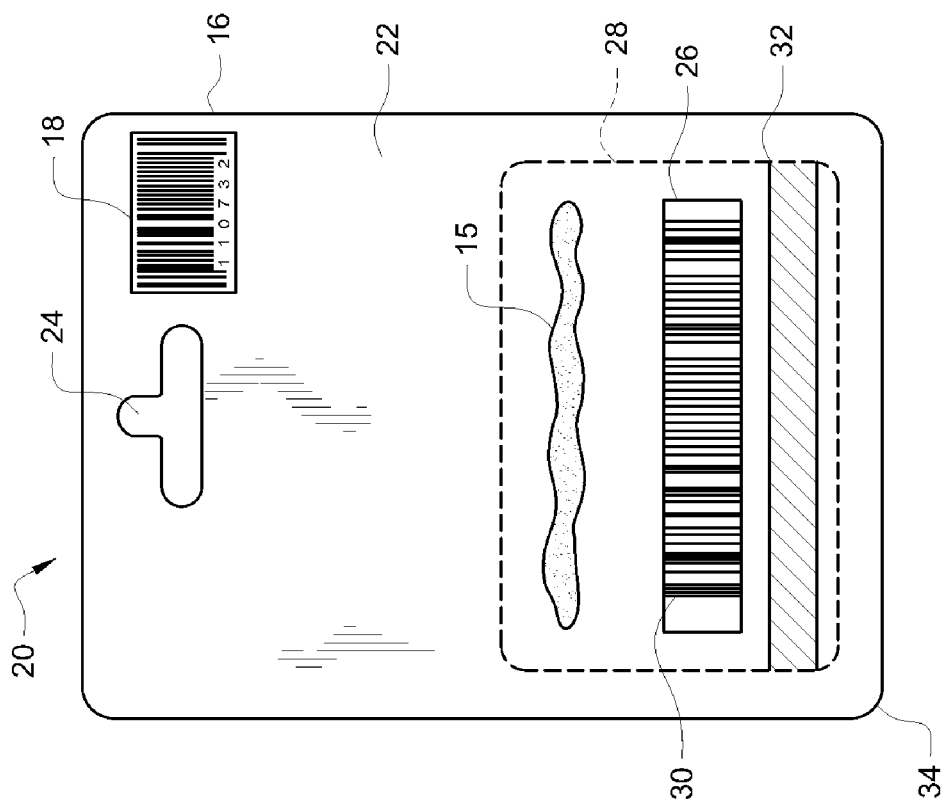

As used herein, transaction card refers to a card that may be used to transact business with a party willing to accept the card, for example as tender for a purchase. Examples of such cards include credit cards, debit cards, gift cards, telephone cards, loyalty cards, membership cards, ticket cards, entertainment cards, sports cards, prepaid cards, and the like. Typically, such cards are wallet-sized and made of plastic. In various embodiments, the transaction card may be a type of card such as a gift or prepaid card that requires activation at a point of sale. For example, a transaction card may be purchased and activated at a point of sale by a consumer and subsequently used by the consumer or another (e.g., the recipient of the card as a gift) to transact business.

Purchase of a transaction card may involve a card vendor, a redeeming merchant, and a card issuer. In various embodiments, the card vendor, redeeming merchant and card issuer may be the same, different, or related entities. The point of sale where the card is purchased and activated is referred to herein as the card vendor or simply vendor. An entity that will accept the card for business transactions, for example as tender for a purchase, is referred to as a redeeming merchant. An entity that provides the financial backing and/or payment processing accessed via the transaction card is referred to as the card issuer or simply issuer. Typically, the issuer is identified on the transaction card and associates a unique issuer account code with each transaction card. Card issuers include direct issuers of cards such as store-branded cards, and in some embodiments the card vendor may also be the card issuer and/or the redeeming merchant. Card issuers also include banks, financial institutions, and transaction processors such as VISA, Mastercard, American Express, etc., and cards issued by such institutions may be readily accepted by a number of redeeming merchants to conduct transactions such as purchases. In some instances, the redeeming merchant may be identified on the transaction card (for example, a retailer branded card such as Store X), and such cards may be sold at the same or different card vendor (e.g., card vendor is Store X or a different or unrelated Store Z). In such instances, the Store X branded transaction card may be issued by Store X, by Store Z, or by a third party such as bank or financial institution.

In an embodiment, a transaction card package assembly comprises a transaction card attached/coupled to or disposed/held within a card holder. The transaction card package assembly, or a component thereof such as the card or card holder, further comprises at least three distinct identifiers, namely a vendor product identification code, an issuer account code, and a combination vendor product identification and issuer account code. The three identifiers may be encoded within bar codes, magnetic stripes, electronic tags such as radio frequency identification (RFID) tags, microprocessors or microchips, or combinations thereof. All three identifiers should be externally visible and/or readily accessible on the package assembly or component thereof for use at a point of sale to activate the transaction card. Having all three identifiers present and visible/readily accessible on the package assembly or component thereof (e.g., the transaction card and/or card holder) allows the transaction card to be activated by either a one-step or a two-step activation sequence. Embodiments described herein having at least three unique identifiers and thus being capable of either one-step or two-step activation are also referred to herein as hybrid embodiments or hybrid package assemblies.

In a two-step activation sequence, the first step comprises entering the vendor product identification code at a point of sale terminal such as a register at a check out lane, which performs a look-up to determine the identity of the product being purchased. For example, the first step may be performed at the point of sale terminal by scanning a UPC bar code, more specifically a 12 digit bar code also referred to as an EAN/UCC-12 or UPC-A, containing the vendor product identification code. A price is typically associated with the look-up and product identification. Such price may be fixed, for example incremental denominations such as a $25 card, $50 card, etc. or alternatively may be a variable amount requested by the customer. The second step comprises entering the issuer account code at the point of sale terminal, which is then used to activate the particular account associated with the transaction card such that the card may be used to transact business with a redeeming merchant. For example, the second step may be performed by swiping a magnetic stripe containing the issuer account code, wherein account information is read from the magnetic stripe and used to activate the account associated with the transaction card. Alternatively, the second step may be performed by scanning a bar code containing the issuer account code, wherein the account information read from the bar code is used to activate the account associated with the transaction card. Alternatively, the second step may be performed by reading an RFID tag or computer chip containing the issuer account code, wherein the account information read from the bar code is used to activate the account associated with the transaction card. Upon being read at the point of sale terminal, the issuer account code may be conveyed (for example, via a computer network) to the issuer or other third party processor responsible for looking up the account code (for example, via a database reconciliation) and activating same.

In a one-step activation sequence, the one step comprises simultaneously entering the combination vendor product identification and issuer account code at a point of sale terminal. For example, the one step may be performed at the point of sale terminal by scanning a bar code, for example an EAN/UCC-128 bar code, containing both a vendor product identification portion and an issuer account portion. The vendor product identification portion may be used to perform a look-up to determine product identity and price as described previously. The issuer account portion may be used to activate the particular account associated with the transaction card such that the card may be used to transact business with the issuer of the card as described previously. As can be seen from these descriptions, the one-step process only requires a single entry by a clerk operating the point of sale terminal to activate the transaction card, whereas the two-step process requires two separate steps to activate the transaction card.

Figure 1A:
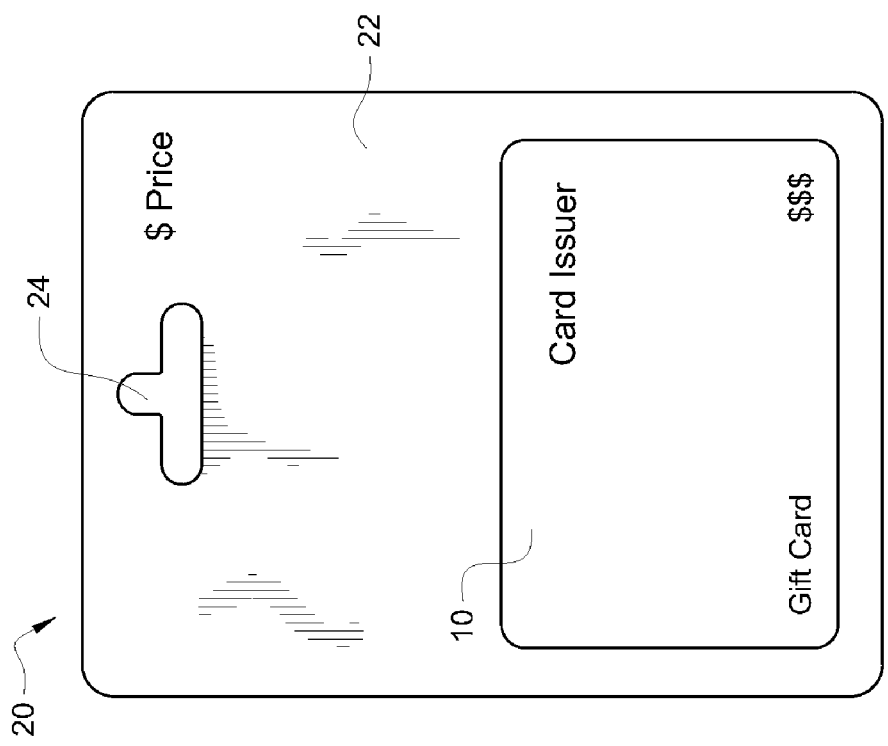

A first embodiment of a hybrid transaction card package assembly 20 is shown in the front view of FIG. 1A and the back view of FIG. 1B. The transaction card package assembly 20 comprises a card 10 releasably attached by a retaining means 15 to a card holder, for example a panel 22 such as a plastic, cardboard, or paper panel. Other types of card holders may be used such as envelopes; folding cards with cut-outs, inserts, and/or pockets; clips; hangers; etc. Non-limiting examples of retaining means 15 include an adhesive (as shown), for example a contact adhesive such as rubberized glue or cement; hook and loop fastener; clips; rivets; snap and break connections; cut-outs, inserts, and/or pockets; or combinations thereof. The retaining means 15 may be disposed between the back of the card 10 and the front of the panel 22, as shown, or in alternative physical arrangements connecting the card 10 and the panel 22. For example, the retaining means 15 may be disposed between the front of the card 10 and the back of the panel 22, or alternatively disposed between any edge of the card 10 and any edge of the panel 22 (e.g., disposed between the top of card 10 and the bottom of panel 22 as shown in FIG. 3, the bottom of card 10 and the top of panel 22, a side of card 10 and a side of panel 22, the top of card 10 and a side of panel 22, etc.).

The panel 22 further comprises an opening 24 and window 26. Opening 24 may be a "sombrero" shaped aperture or cut-out suitable for receiving a shelf or rack rod and hanging the package assembly 20 from a display rack in a retail store. The window 26 may be an aperture or cut-out, or alternatively may be a transparent portion such as a cut-out covered by a clear film. In the back view shown in FIG. 1B, the position of card 10 is indicated by dashed line 28. As is shown in FIG. 1B, the card 10 is positioned and attached via retaining means 15 to panel 22 such that a bar code 30 located on the back of card 10 is visible through window 26. In an embodiment, bar code 30 is an EAN/UCC-128 bar code containing both a vendor product identification portion and an issuer account portion encoded thereon. In alternative embodiments of FIG. 1, the bar code 30 may be located on the card 10 (as shown), on the panel 22, or both. Where the bar code 30 is present both on the card 10 and the panel 22, the bar code 30 on card 10 may be obscured by panel 22 (e.g., window 26 may be omitted from panel 22), if desired.

The card 10 further comprises a magnetic stripe 32, which is accessible for swiping at a point of sale terminal. For example, a lower portion 34 of the panel 22 may be folded back such that the magnetic stripe may be swiped through a magnetic stripe reader at the point of sale terminal. The retaining means 15 may be positioned on an upper portion of the card 10 such that a lower portion of the card 10 containing the magnetic stripe 32 is not connected to the panel 22, thereby allowing the panel 22 to be readily folded back away from card 10. In an embodiment, the magnetic stripe is encoded with an issuer account code.

The panel 22 further comprises a bar code 18, as shown in FIGS. 1-6. In an embodiment, the bar code is an EAN/UCC-12 bar code containing the vendor product identification code. The bar code 18 may be located on the front of panel 22, on the back of panel 22 (as shown), or both. In an embodiment, the bar code 18 is positioned on an upper portion 16 of the panel 22, for example in an upper corner of panel 22 adjacent the opening 24. Positioning the bar code 18 on the upper portion 16 of the panel 22 distances the bar code 18 from other bar codes that may be present at or near the lower portion 34 of the panel 22 and/or on the card 10 (e.g., bar code 30), and may thereby aid in the scanning of the bar codes.

Figure 2A:
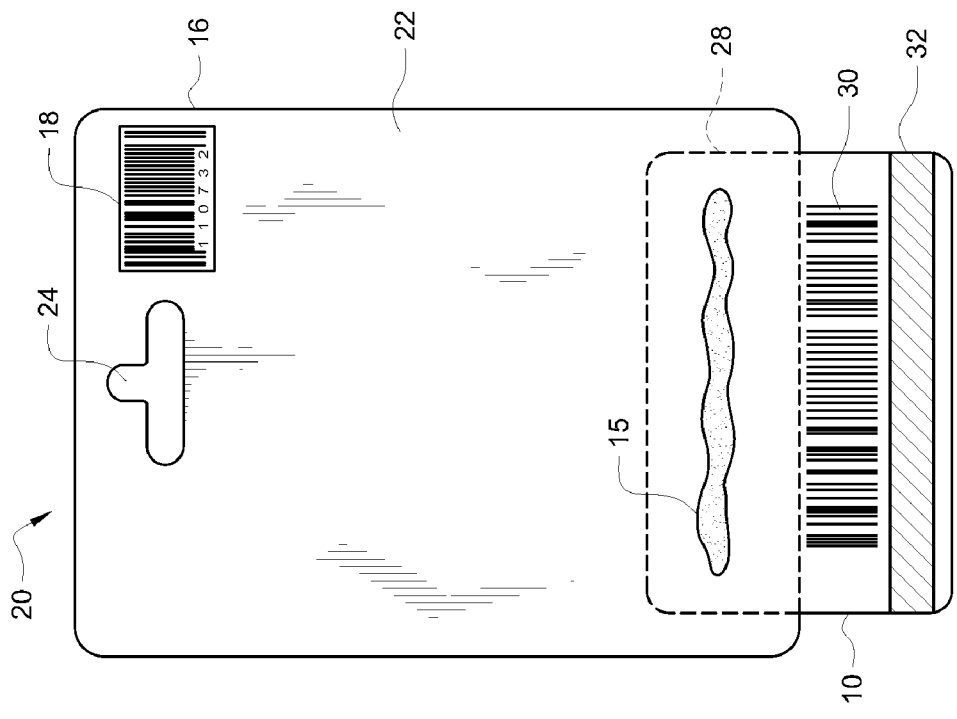
Figure 2B:
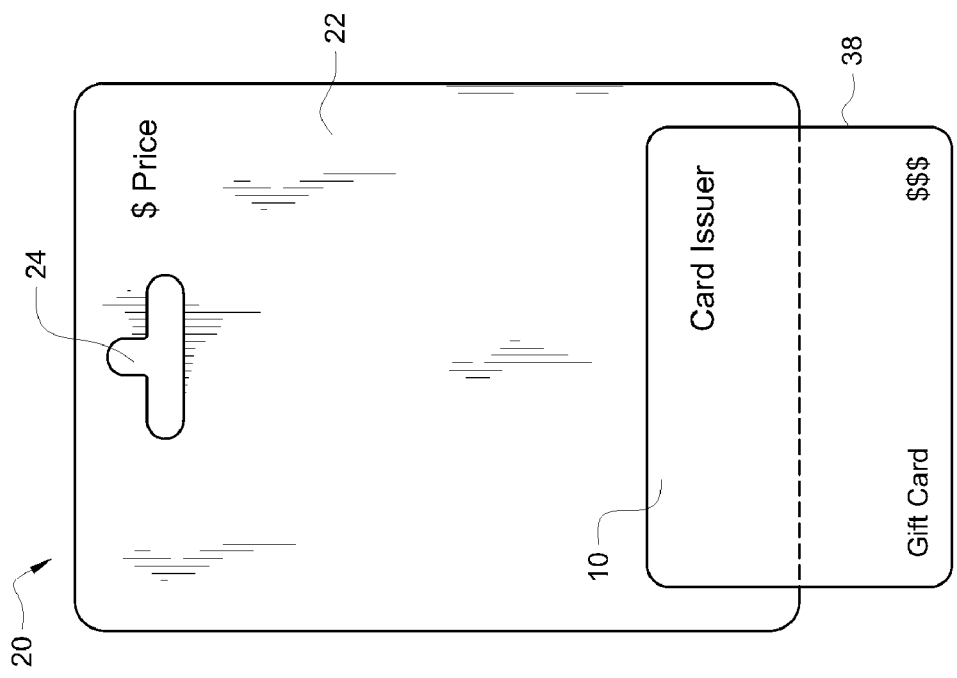

A second embodiment of a hybrid transaction card package assembly 20 is shown in the front view of FIG. 2A and the back view of FIG. 2B. A lower portion 38 of card 10 may extend downward from the panel 22 such that the magnetic stripe 32 may be read without folding the panel 22. The card 10 may be positioned lower on the panel 22, such that the magnetic stripe 22 extends beyond (e.g., is externally remote from) the outer perimeter of panel 22 while a portion of the back of card 10 remains in contact with a portion of the front of panel 22 (with retaining means 15 disposed there between). Likewise, bar code 30 on card 10 may extend beyond panel 22 such that window 26 is not needed in panel 22. In alternative embodiments of FIG. 2, the bar code 30 may be located on the card 10 (as shown), on the panel 22, or both. Where the bar code 30 is present both on the card 10 and the panel 22, the bar code 30 on card 10 may be obscured by panel 22, if desired.

A third embodiment of a hybrid transaction card package assembly 20 is shown in the front view of FIG. 3A and the back view of FIG. 3B. The top of card 10 may be attached to the bottom of the panel 22, with retaining means 15 such as a snap and break or perforated connection disposed there between. A lower portion of card 10 contains a magnetic stripe 32 that may be easily swiped at a point of sale terminal. In alternative embodiments of FIG. 3, the bar code 30 may be located on the card 10 (as shown), on the panel 22, or both.

Figure 4A:
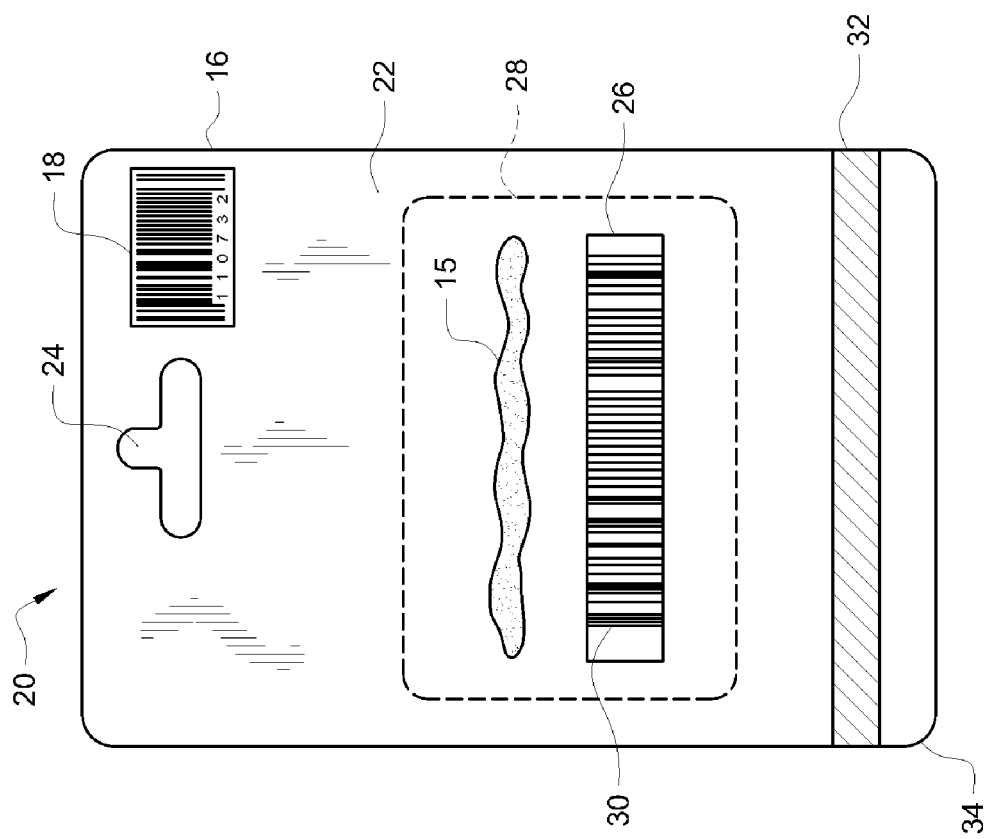
Figure 4B:
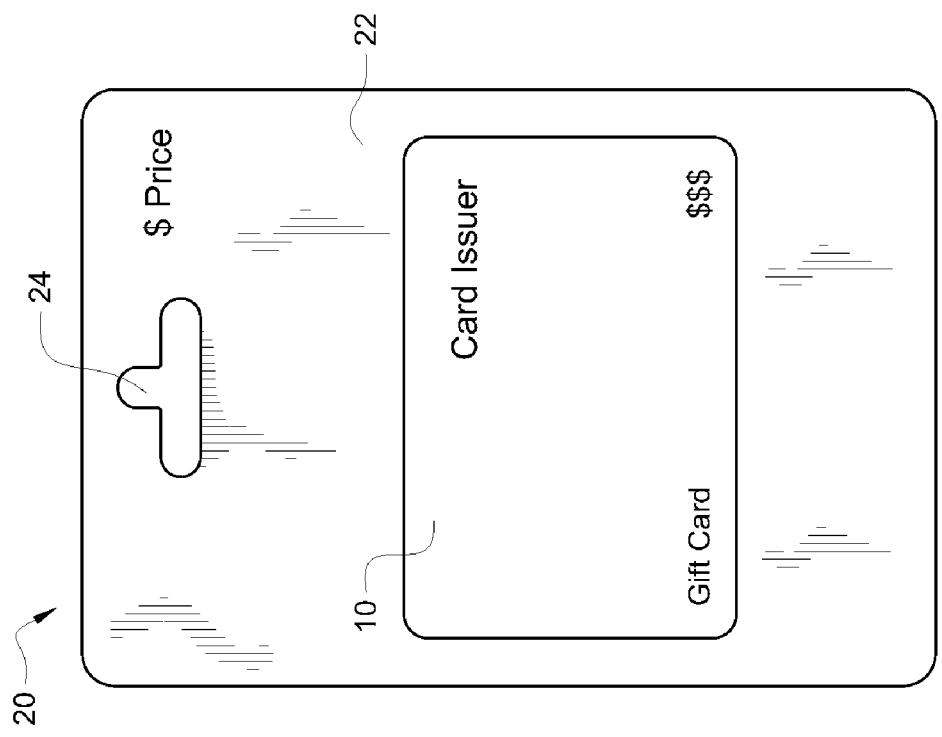

A fourth embodiment of a hybrid transaction card package assembly 20 is shown in the front view of FIG. 4A and the back view of FIG. 4B. The card 10 is positioned and attached via retaining means 15 to panel 22 such that a bar code 30 located on the back of card 10 is visible through window 26. In alternative embodiments of FIG. 4, the bar code 30 may be located on the card 10 (as shown), on the panel 22, or both. Where the bar code 30 is present both on the card 10 and the panel 22, the bar code 30 on card 10 may be obscured by panel 22 (e.g., window 26 may be omitted from panel 22), if desired. The panel 22 contains a magnetic stripe 32, for example located on the lower portion 34 of panel 22. The card 10 may also have a magnetic stripe, wherein the magnetic stripe on the panel 22 and the magnetic stripe on the card 10 each contain the same issuer account code.

A further embodiment of a hybrid transaction card package assembly 20 is shown in the front view of FIG. 5A and the back view of FIG. 5B. The card 10 is disposed within the package assembly 20 such that information on the front and back of card 10 is obscured by package assembly 20. For example, package assembly 20 may comprise a front panel 22a and a back panel 22b which are sealed at the edges to form an envelope containing the card 10. The panels 22a and 22b may be solid such that the card 10 is completely obscured from view while in the package assembly 20 (as shown), or alternatively panels 22a and 22b may contain one or more windows to display portions of card 10. For example, panel 22a may contain a front window such as a cutout or transparent film to allow the front of card 10 to be visible while displayed in package assembly 20. The card 10 may be secured within the envelope by retaining means 15, or retaining means 15 may optionally be omitted, thereby allowing the card 10 to have some movement within the envelope formed by panels 22a and 22b. The bar code 30 may be located on the panel 22b (as shown), on the card and visible through a window (for example, window 26 as shown in FIG. 4B), or both. Where the bar code 30 is present both on the card 10 and the panel 22b, the bar code 30 on card 10 may be obscured by panel 22b (e.g., window 26 may be omitted from panel 22b), if desired. The panel 22b contains a magnetic stripe 32, for example located on the lower portion 34 of panel 22b. The card 10 may also have a magnetic stripe, wherein the magnetic stripe on the panel 22b and the magnetic stripe on the card 10 each contain the same issuer account code.

Figure 6B:
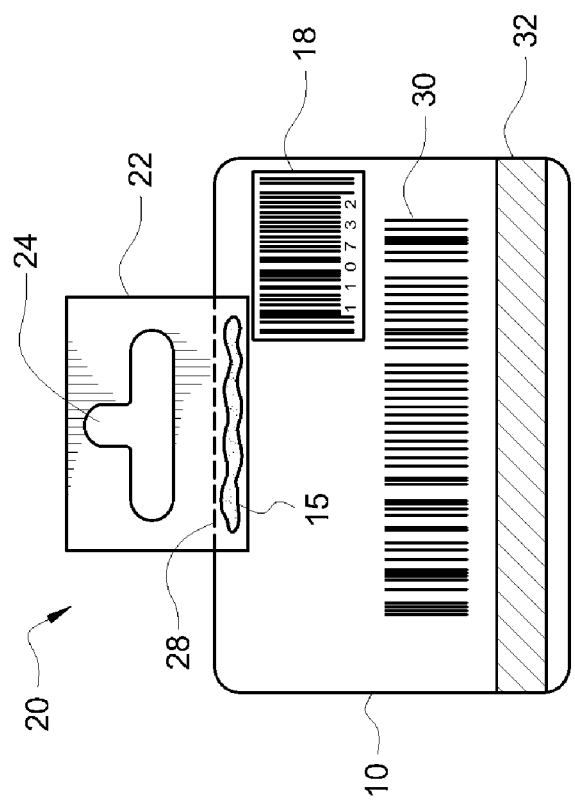
Figure 6A:
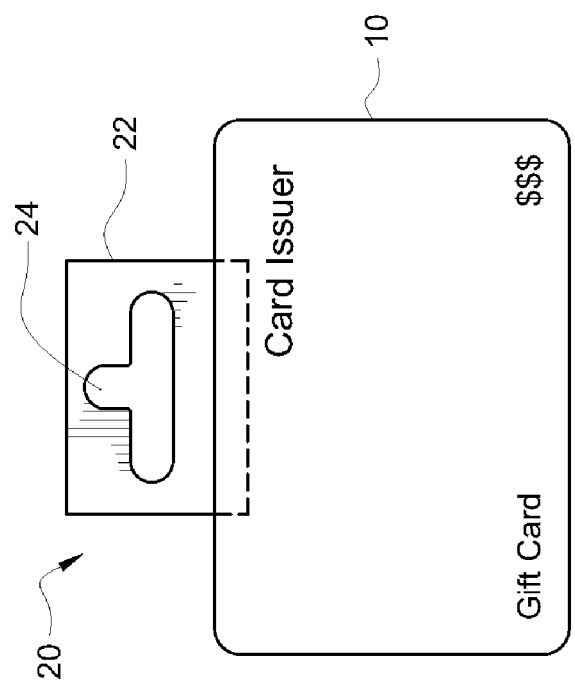

A sixth embodiment of a hybrid transaction card package assembly 20 is shown in the front view of FIG. 6A and the back view of FIG. 6B. The card 10 contains a first bar code 18 (e.g., EAN/UCC-12 bar code), a second bar code 30 (e.g., a EAN/UCC-128 bar code), and a magnetic stripe 32. Given that all three identifiers are located on card 10, the size of the panel 22 may be minimized or optionally omitted, if desired. For example, panel 22 may be sized smaller than the card 10, more specifically panel 22 may be minimally sized to provide sufficient surface area for opening 24 and to provide sufficient structural integrity to support the weight of card 10 while on display. In an embodiment, panel 22 is a hanger tab, for example a clear plastic tab, that may be attached via retaining means 15 to the back of card 10 (as shown), to the front of card 10, or both (for example, by a fold-over tab having mirror image front and back portions). Where hanger 22 is omitted, the card may be displayed in a rack, box, shelf, or the like. The embodiments shown in FIGS. 2-6, each have an exposed magnetic stripe near the bottom of the package assembly, allow the magnetic stripe to be easily swiped at a point of sale terminal as part of the activation process.

Other hybrid embodiments may be apparent in view of the disclosure herein, provided that each such embodiment has the three identifiers visible or readily accessible on the package assembly or component thereof (e.g., the card or the card holder) such that card can be activated at a point of sale terminal via either a one-step or a two-step activation process. For example, each of the embodiments shown in FIGS. 1-6 have the identifiers (e.g., bar code 18, bar code 30, and magnetic stripe 34) located on the back of the card 10 and/or the panel 22, which may be preferred for marketing or aesthetic purposes. Alternatively, one or more of the identifiers may be located on the front of the package assembly 20 or a component thereof such as the card 10 and/or the card holder (e.g., panel 22). For example, the bar code 18 may be located on the front of panel 22, such as in an upper corner of panel 22 where a price is indicated in the figures.

Package assembly embodiments as described herein may be manufactured according to various methods known in the art. For example, transaction cards can be manufactured and printed and subsequently placed in a printed card holder, or alternatively the transaction card and card holder can be made concurrently, for example via coextrusion of a plastic sheet with subsequent printing. Alternative methods of making the various embodiments disclosed herein will be apparent to those skilled in the art.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What we claim as our invention is:

1. A transaction card package assembly comprising a transaction card and a card holder, wherein the package assembly further comprises at least three unique identifiers thereon such that the transaction card may be activated at a point of sale by both one-step or two-step activation process processes, and wherein the three unique identifiers each comprise a different one of a vendor product identification code, an issuer account code, and a combination vendor product identification and issuer account code.

2. The package assembly of claim 1 comprising the three unique identifiers encoded within bar codes, magnetic stripes, electronic tags, radio frequency identification tags, microprocessors, microchips, or combinations thereof.

3. The package assembly of claim 1 comprising the vendor product identification code encoded within a UPC bar code.

4. The package assembly of claim 3 wherein the UPC bar code comprises an EAN/UCC-12 bar code.

5. The package assembly of claim 4 wherein the EAN/UCC-12 bar code is on the transaction card.

6. The package assembly of claim 5 wherein the EAN/UCC-128 bar code is on the transaction card.

7. The package assembly of claim 4 wherein the EANI-UCC-12 bar code is on the card holder.

8. The package assembly of claim 7 wherein the EAN/UCC-128 bar code is on the card holder.

9. The package assembly of claim 1 comprising the issuer account code encoded within a magnetic stripe.

10. The package assembly of claim 9 wherein the magnetic stripe is on the transaction card.

11. The package assembly of claim 10 wherein the magnetic stripe is on the transaction card.

12. The package assembly of claim 11 wherein the EAN/UCC-128 bar code is on the transaction card.

13. The package assembly of claim 10 wherein the EAN/UCC-128 bar code is on the transaction card.

14. The package assembly of claim 9 wherein the magnetic stripe is on the card holder.

15. The package assembly of claim 14 wherein the magnetic stripe is on the card holder.

16. The package assembly of claim 15 wherein the EAN/UCC-128 bar code is on the card holder.

17. The package assembly of claim 14 wherein the EAN/UCC-128 bar code is on the card holder.

18. The package assembly of claim 1 comprising the combination vendor product identification and issuer account code encoded within an EANIUCC-128 bar code.

19. The package assembly of claim 18 wherein the EANI-UCC-128 bar code is on the transaction card.

20. The package assembly of claim 18 wherein the EAN/UCC-128 bar code is on the card holder.

21. The package assembly of claim 1 wherein the one-step activation process comprises scanning an EAN/UCC-12 bar code.

22. The package of claim 1 wherein the two-step activation process comprises scanning a UPC bar code and swiping a magnetic stripe.

23. The package assembly of claim 22 wherein the UPC bard code comprises an EAN/UCC-12 bar code.

* * * * *

UNITED STATES PATENT AND TRADEMARK OFFICE
CERTIFICATE OF CORRECTION

PATENT NO. : 7,607,574 B2
APPLICATION NO. : 11/380838
DATED : October 27, 2009
INVENTOR(S) : Donald Kingsborough, Talbott Roche and Amie Petersen It is certified that error appears in the above-identified patent and that said Letters Patent is hereby corrected as shown below:

In Column 6:
    Claim 1, Line 51, delete "process" between "activation" and "processes"
    Claim 6, Lines 66 and 67, replace "the EAN/UCC-128" with -- an EAN/UCC-128 --

In Column 7:
    Claim 7, Lines 1 and 2, replace "EANI-UCC-12" with -- EAN/UCC-12 --
    Claim 8, Lines 3 and 4, replace "the EAN/UCC-128" with -- an EAN/UCC-128 --
    Claim 12, Lines 11 and 12, replace "the EAN/UCC-128" with -- an EAN/UCC-128 --
    Claim 13, Lines 13 and 14, replace "the EAN/UCC-128" with -- an EAN/UCC-128 --
    Claim 16, Lines 19 and 20, replace "the EAN/UCC-128" with -- an EAN/UCC-128 --

In Column 8:
    Claim 17, Lines 1 and 2, replace "the EAN/UCC-128" with -- an EAN/UCC-128 --
    Claim 18, Line 5, replace "EANIUCC-128" with -- EAN/UCC-128 --
    Claim 19, Lines 6 and 7, replace "EANI-UCC-128" with -- EAN/UCC-128 --
    Claim 21, Line 11, replace "EAN/UCC-12" with -- EAN/UCC-128 --
    Claim 23, Line 18, replace "bard code" with -- bar code --

Signed and Sealed this

Fourteenth Day of September, 2010

David J. Kappos
*Director of the United States Patent and Trademark Office*